(12) United States Patent
Jeddeloh

(10) Patent No.: US 6,789,155 B2
(45) Date of Patent: Sep. 7, 2004

(54) SYSTEM AND METHOD FOR CONTROLLING MULTI-BANK EMBEDDED DRAM

(75) Inventor: Joseph Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 482 days.

(21) Appl. No.: 09/942,389

(22) Filed: Aug. 29, 2001

(65) Prior Publication Data

US 2003/0046477 A1 Mar. 6, 2003

(51) Int. Cl.[7] .............................................. G06F 12/00
(52) U.S. Cl. ................. 711/5; 365/230.03; 365/230.05; 710/107
(58) Field of Search ...................... 711/5, 131, 149–150, 711/151, 158, 168, 157, 169; 365/230.05; 710/40, 107, 112–113

(56) References Cited

U.S. PATENT DOCUMENTS

| | | | | |
|---|---|---|---|---|
| 5,067,071 A | * | 11/1991 | Schanin et al. ............. 710/113 |
| 5,167,028 A | * | 11/1992 | Shires ........................ 711/147 |
| 5,440,713 A | * | 8/1995 | Lin et al. .................... 711/158 |
| 5,555,560 A | * | 9/1996 | Komatsuda et al. ........... 711/5 |
| 5,740,380 A | | 4/1998 | LaBerge et al. ............. 710/107 |
| 5,742,761 A | * | 4/1998 | Olnowich et al. ........... 709/250 |
| 5,805,835 A | | 9/1998 | Jeddeloh et al. ............ 710/107 |
| 5,878,235 A | | 3/1999 | Porterfield et al. ......... 710/112 |
| 5,935,233 A | | 8/1999 | Jeddeloh ..................... 710/129 |
| 5,978,872 A | | 11/1999 | Porterfield et al. ......... 710/100 |
| 5,991,843 A | | 11/1999 | Porterfield et al. ......... 710/112 |
| 5,991,855 A | | 11/1999 | Jeddeloh et al. ............ 711/146 |
| 6,002,883 A | * | 12/1999 | Goldrian ...................... 710/36 |
| 6,018,792 A | | 1/2000 | Jeddeloh et al. ............ 711/146 |
| 6,049,855 A | | 4/2000 | Jeddeloh ..................... 711/157 |
| 6,145,040 A | | 11/2000 | LaBerge et al. ............. 710/107 |
| 6,157,398 A | | 12/2000 | Jeddeloh ..................... 345/521 |
| 6,199,138 B1 | | 3/2001 | Jeddeloh ..................... 711/105 |
| 6,202,133 B1 | | 3/2001 | Jeddeloh ..................... 711/157 |
| 6,212,598 B1 | | 4/2001 | Jeddeloh ..................... 711/105 |
| 6,252,612 B1 | | 6/2001 | Jeddeloh ..................... 345/521 |
| 6,272,609 B1 | | 8/2001 | Jeddeloh ..................... 711/169 |
| 6,275,913 B1 | | 8/2001 | Jeddeloh ..................... 711/158 |
| 6,275,914 B1 | | 8/2001 | Jeddeloh ..................... 711/158 |
| 6,295,592 B1 | | 9/2001 | Jeddeloh ..................... 711/169 |
| 6,301,627 B1 | * | 10/2001 | Neal et al. ..................... 710/40 |
| 6,504,785 B1 | * | 1/2003 | Rao ........................ 365/230.05 |
| 6,647,387 B1 | * | 11/2003 | McKean et al. ............... 707/9 |

* cited by examiner

*Primary Examiner*—Nasser Moazzami
(74) *Attorney, Agent, or Firm*—Fish & Neave; Jeffrey H. Ingerman

(57) ABSTRACT

In a computer or microprocessor-based system having a plurality of resources making memory requests of a plurality of banks of memory, a switch-based interconnect system allows multiple simultaneous connections between resources and memory banks, maximizing memory throughput and bandwidth concurrency. The invention is particularly useful in devices having embedded banks of memory, where there are no external constraints requiring use of a bus architecture, but can be used with discrete devices as well.

102 Claims, 6 Drawing Sheets

SYSTEM AND METHOD FOR CONTROLLING MULTI-BANK EMBEDDED DRAM

BACKGROUND OF THE INVENTION

This invention relates to memory flow control in a microprocessor-based system having embedded DRAM. More particularly, this invention relates to a switch-based controller for memory requests in a microprocessor-based system having multiple DRAM banks.

It is becoming increasingly common to provide integrated circuit devices having both logic and DRAM memory on-board; such devices are known as "embedded DRAM" devices. Such devices can include complete or nearly complete microprocessor systems, with the microprocessor and other logic (e.g., coprocessors, I/O controllers, etc.), as well as multiple banks of DRAM, all included on the same chip or on chips within the same chipset.

Those various logic and embedded DRAM components could communicate just as they do in systems in which they are provided as discrete devices—i.e., using a bus architecture. However, in a bus architecture, only one device can use the bus at a time, which causes a bottleneck that affects data throughput. Moreover, with embedded devices, there are no external interfaces that would constrain one to use a bus architecture. Therefore, a need exists for a faster system and method for communication between logic devices and DRAMs embedded therewith.

SUMMARY OF THE INVENTION

In accordance with the present invention, the standard bus architecture for communicating between various banks of memory and various system resources is replaced by a switch-based architecture. The switch receives memory requests from system resources and relays each request to the appropriate bank of memory when that bank indicates that it is not busy. When the bank of memory returns the result of the request, the switch establishes a connection between that bank of memory and the system resource that made the request, as soon as that resource is also free. While the invention is particularly useful in systems in which the memory banks are embedded DRAM memory, it is also applicable where any one or more of the memory banks and other system resources are discrete devices.

In order to facilitate the routing of requests and returned data by the switch to the appropriate memory bank or system resource, each request preferably includes both a source tag and a destination tag. The destination tag is applied to a request by the system resource making the request. The source tag also may be applied to the request by the system resource making the request, but alternatively may be applied by the switch, which knows the identity of the resource by virtue of the requestor port through which the system resource is attached to the switch.

Similarly, each memory bank is attached to the switch through a respective memory port. When a memory bank returns the result of a memory request, the identity of the memory bank is preferably ascertained based on the memory port to which it is attached. The destination system resource for the result can be indicated by a destination tag applied by the local controller of the memory bank, or the switch can keep track of which memory requests have been routed to which memory banks and which resources made the requests, so that when a particular memory bank returns its result, the switch "knows" which system resource made the request that that memory bank was working on, and therefore to which system resource the result should be returned.

Thus, in accordance with the invention, a computer system is provided having a plurality of banks of memory and a plurality of system resources that submit memory requests to the memory. The system is preferably a single chip having both logic and embedded memory, particularly DRAM memory. A switch interconnects the plurality of banks of memory and the plurality of system resources, and establishes communications between (a) a respective one of the resources, and (b) a respective one of the banks of memory of which the respective one of the resources makes a request. The connection is not established until the respective one of the resources and the respective one of the banks of memory are both available. The switch architecture allows multiple connections to exist between different memory port/requester port pairs, although at any one time, each memory port can be connected to only one requester port and vice-versa.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
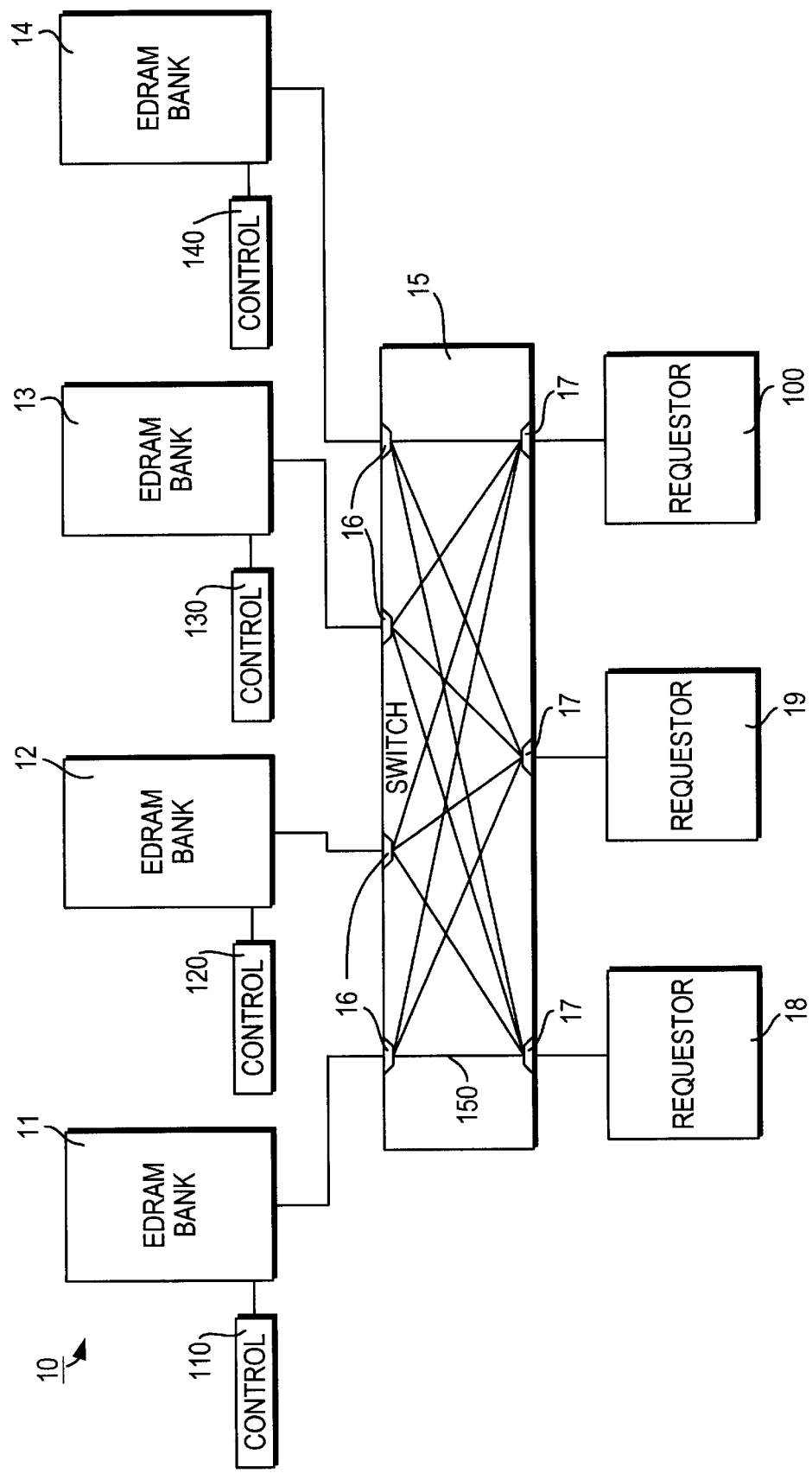
FIG. 1 is a schematic representation of a system in accordance with the present invention.
Figure 2:
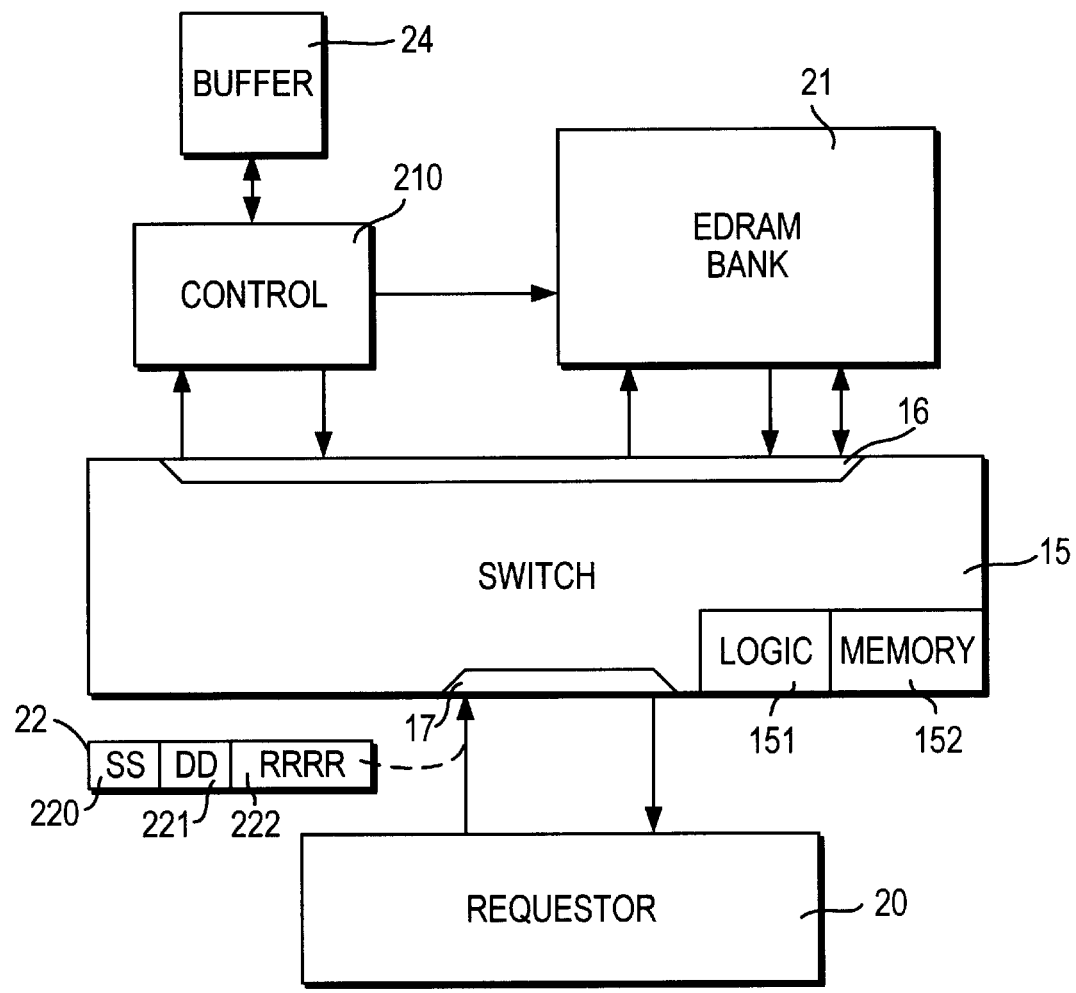
FIGS. 2–6 are schematic representations of various steps in the processing of a memory request by a system resource to a memory bank in accordance with the present invention.

As described above, the present invention provides a switch-based interconnection between various banks of memory and various system resources, of the type that make memory requests, in a processor system or computer system. The invention is particularly advantageous in an embedded system in which at least some of the memory banks are banks of DRAM memory embedded in the same chip or chip set as the switch itself and at least one of the system resources. However, it presents advantages even in the case of systems where some or all of the system components are discrete.

The primary advantage, whether in embedded, discrete or mixed systems, is that more than one memory/system resource pair can communicate at one time. Depending on the degree to which the switch is populated, and the relative numbers of resources and memory banks, it may be possible for every resource to be communicating with a memory bank simultaneously. If, as is preferably the case, the switch is fully populated—i.e., every requestor port can communicate with every memory port and vice-versa—then if the numbers of memory banks and resources are equal, every resource can communicate with every memory bank simultaneously. If the numbers are unequal, then for whichever group (i.e., memory banks vs. resources) the number is lower, all members of that group can communicate with a member of the other group simultaneously. This contrasts with a system that uses a bus in which only one resource/memory bank pair can communicate at any one time, and only when no other type of system resource is using the bus.

The result is a high-bandwidth interactive structure that maximizes data throughput and bandwidth concurrency.

Moreover, the structure is easily scaled to systems having any number of memory banks and any number of system resources, simply by increasing the number of ports on the switch.

In accordance with the invention, when a system resource makes a memory request directed to a certain bank of memory, the memory request is tagged by the requesting system resource with a tag identifying the destination memory bank. The tag may be a separate message accompanying the request, or may be a field within the request. The request is transmitted to the switch via the dedicated connection between the system resource and a requester port, dedicated to that resource, on the switch. A source tag preferably is also attached to the request, either by the resource issuing the request or by the switch, as discussed below.

Next, the switch checks the destination tag of the request to see which memory bank it is for. The system then queues the request and waits until that memory bank is ready to accept requests, as signalled to the switch by the dropping of the memory bank's "request busy" indicator. At that time, the switch routes the request to the memory bank. The switch may or may not keep a record of the request as being pending, and may or may not include the source and request tags when it sends the request to the memory bank.

Specifically, if the switch sends the source and destination tags (especially the source tag) to the memory bank with the request, then the memory bank, or its local controller, can send the source tag back with the resulting data as a destination tag, and the switch can use that destination tag to identify the requester to which the data should be returned. On the other hand, the switch could keep a record of which memory banks have been sent requests and which system resources are the requestors of those requests. Assuming that a particular memory bank can only respond to one request at a time, when a memory bank returns data, the switch can "know" from its record which resource made the original request, and return the data accordingly.

If the memory bank accepts the request, it sends an acknowledgment signal to the switch which returns the acknowledgment to the requesting resource, which then "knows" its request has been accepted. Otherwise, the resource might repeat the request periodically until it is acknowledged.

To return the data once the memory bank has signalled that is ready to do so by deactivating its data busy indicator (meaning that it is no longer busy retrieving the data, and therefore is ready to return it), the switch checks to see if the data ready indicator of the requesting resource is active (meaning that is ready to accept data). If the data ready indicator is not active, the response is queued and the switch waits until the data ready indicator becomes active. Once the data ready indicator of the requesting resource is active, the switch establishes a connection between the memory port serving the memory bank to which the request was made and the requester port serving the system resource that made the request, and the data are returned to the requesting resource. Many such connections can be active at once, allowing multiple simultaneous transfers of data from individual memory banks to different system resources that have requested data.

In accordance with the invention, the source tag may be attached to memory requests by the system resource that makes the request, which can be given sufficient awareness of its own identity to be able to attach the tags. Alternatively, the switch could assign the source tag, based on its "knowledge" of which requestor port the request was received on. As long as each requester port serves only one system resource, it is sufficient for the switch to "know" which port to return the data to once it has been retrieved. However, the destination tag would have to be applied by the requesting resource; there is no way the switch could know on its own which memory bank is being queried by the requesting resource.

Similarly, when data are being returned by a memory bank, the local controller of the memory bank could apply a source and destination tag, but both tags could also be applied by the switch. In this case, as long as each memory port serves only one memory bank, the switch knows which memory bank is returning the data, and can apply a source tag to the data. And if the switch has kept a record as described above of which memory bank it has sent each request to and where that request originated, it also can apply a destination tag to the data. Of course, in both of those cases, it is actually unnecessary to apply the tags, because the switch can merely set up the connection based on its stored record, once the busy indicators of the memory bank and the requesting resource show that both are ready to return and accept the data, respectively.

Indeed, a source tag on data being returned is unnecessary unless the destination system resource that originally requested the data has outstanding requests to more than one memory bank. Otherwise, it is sufficient that the data is tagged with the identification of the destination system resource; that resource will "know" that the returned data are in response to the only outstanding request it has pending. Preferably, however, the present invention accommodates system resources that can have multiple requests outstanding, because multiple requestor/memory bank pairs may be active at once. If one memory bank of which a particular resource has made a request is busy dealing with another resource, then the particular resource can deal with a different memory bank of which it has also made a request.

The invention will now be described with reference to FIGS. 1–6.

A memory control system 10 according to the present invention may be used, e.g., in a personal computer, server or workstation. Memory control system 10 preferably includes a plurality of banks 11, 12, 13, 14 of memory (preferably DRAM memory), each having its own respective local controller or slave 110, 120, 130, 140. System 10 also preferably includes a multi-port memory control switch 15 having a plurality of memory ports 16 at least equal in number to the number of memory banks 11, 12, 13, 14. Memory control switch 15 also has a plurality of requester ports 17 through which it interfaces with system resources 18, 19, 100, which issue memory requests and receive the resulting data. It should be noted that while the primary functions of system resources 18, 19, 100 are not memory control—e.g., in a computer system each could be an input/output device, an arithmetic logic unit, etc., or even the central processing unit (CPU) itself—resources 18, 19, 100 are considered part of memory control system 10 because the flow of memory requests is controlled in part by tags that they apply to requests and by how they react to tags that are included in replies to requests that they have made, and they have the ability to pace data by how they assert or deassert their respective data ready and/or data busy indicators.

In one embodiment of the invention, each of requesting system resources 18, 19, 100 preferably has a unique identification code. In this embodiment, when one of system resources 18, 19 100 makes a memory request, it preferably includes that unique identification code in the request—preferably, e.g., as a distinct field within the same message as the request—as a source tag, preferably along with a destination tag identifying the appropriate one of memory banks 11, 12, 13, 14 as the destination of the request. The request preferably is passed along to switch 15 through one of requestor ports 17, and then through the appropriate one of memory ports 16 to the desired memory bank 11, 12, 13, 14.

According to this embodiment, each memory bank 11, 12, 13, 14 preferably also has a unique identification code, and preferably it is that code which is used by the requesting resource 18, 19, 100 in the destination tag. When the desired memory bank 11, 12, 13, 14 has retrieved the data specified in the request, it preferably sends the data back to the requesting resource 18, 19, 100 through switch 15, attaching a source tag including its own unique identification code (what was the destination tag in the original request), and a destination tag including the unique identification code of the requesting resource (what was the source tag in the original request).

For purposes of both source and destination tags, each memory bank 11, 12, 13, 14, and resource 18, 19, 100 could be assigned an identification code that is used in those tags. Alternatively, each memory bank 11, 12, 13, 14 and resource 18, 19, 100 could be known by the number of the memory port 16 or requester port 17 to which it is attached. This latter alternative is particularly (but not exclusively) suited to an embodiment where switch 15 keeps track of which requests are pending at which memory bank and who the requester is, or to an embodiment wherein the switch uses the port data to assign source and/or destination tags.

FIGS. 2–6 show the interaction between one system resource 20 (which could be any of system resources 18, 19, 100) and one memory bank 21 (which could be any one of memory banks 11, 12, 13, 14) through switch 15.

As seen in FIG. 1, switch 15 preferably includes a fully populated set of interconnections 150 between memory ports 16 and requestor ports 17, so that any memory port can communicate with any requester port and vice-versa. Switch 15 preferably also includes logic 151 and memory 152 for keeping track of and controlling the flow of memory requests and responses to those requests. A request 22 issued by system resource 20 preferably includes three fields 220, 221, 222, respectively containing the source tag (indicated as "SS"), the destination tag ("DD") and the request itself ("RRRR"). In this case, the destination tag has been applied by system resource 20, while the source tag can be applied by either system resource 20 or by switch 15 based on the identity of requester port 23 through which resource 20 is connected to switch 15.

Figure 3:
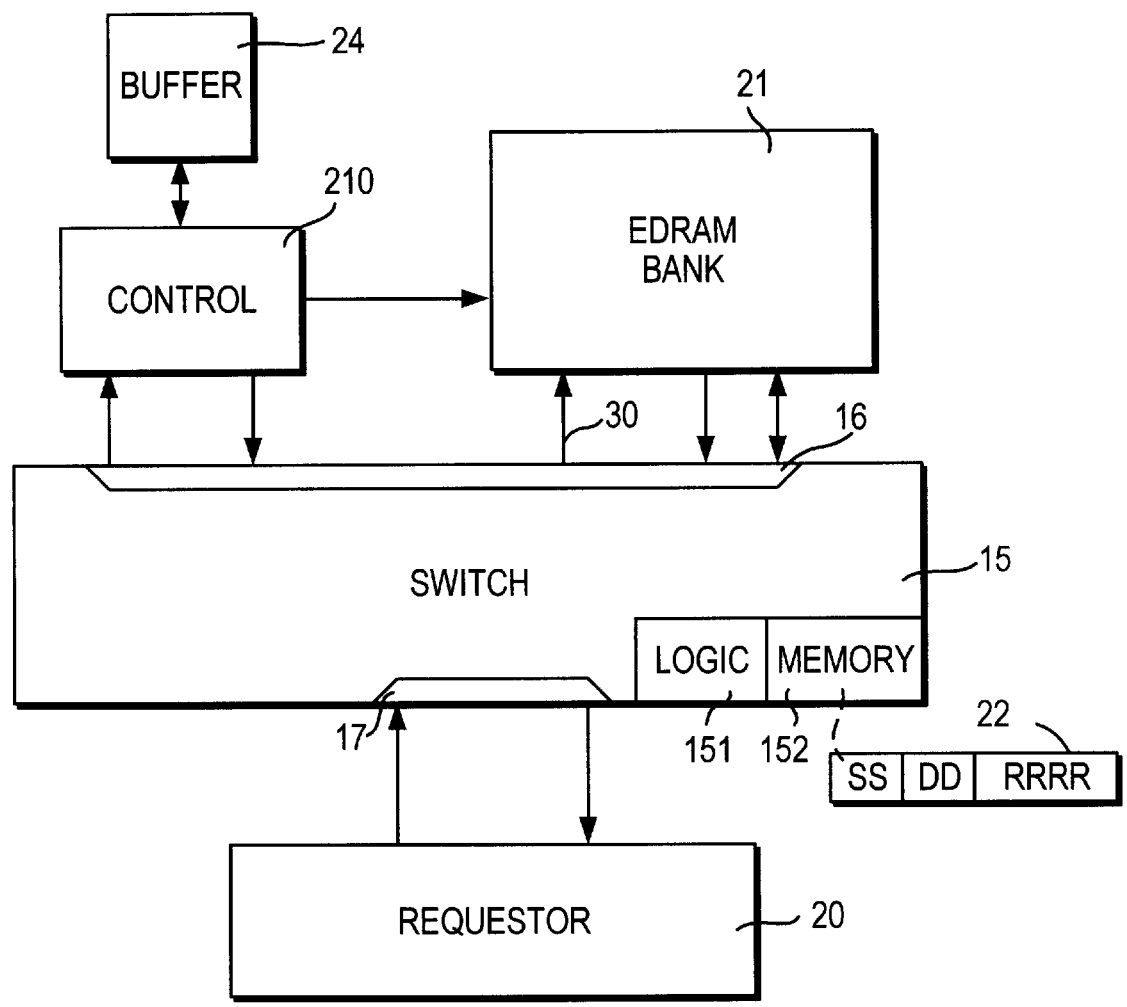
Figure 4:
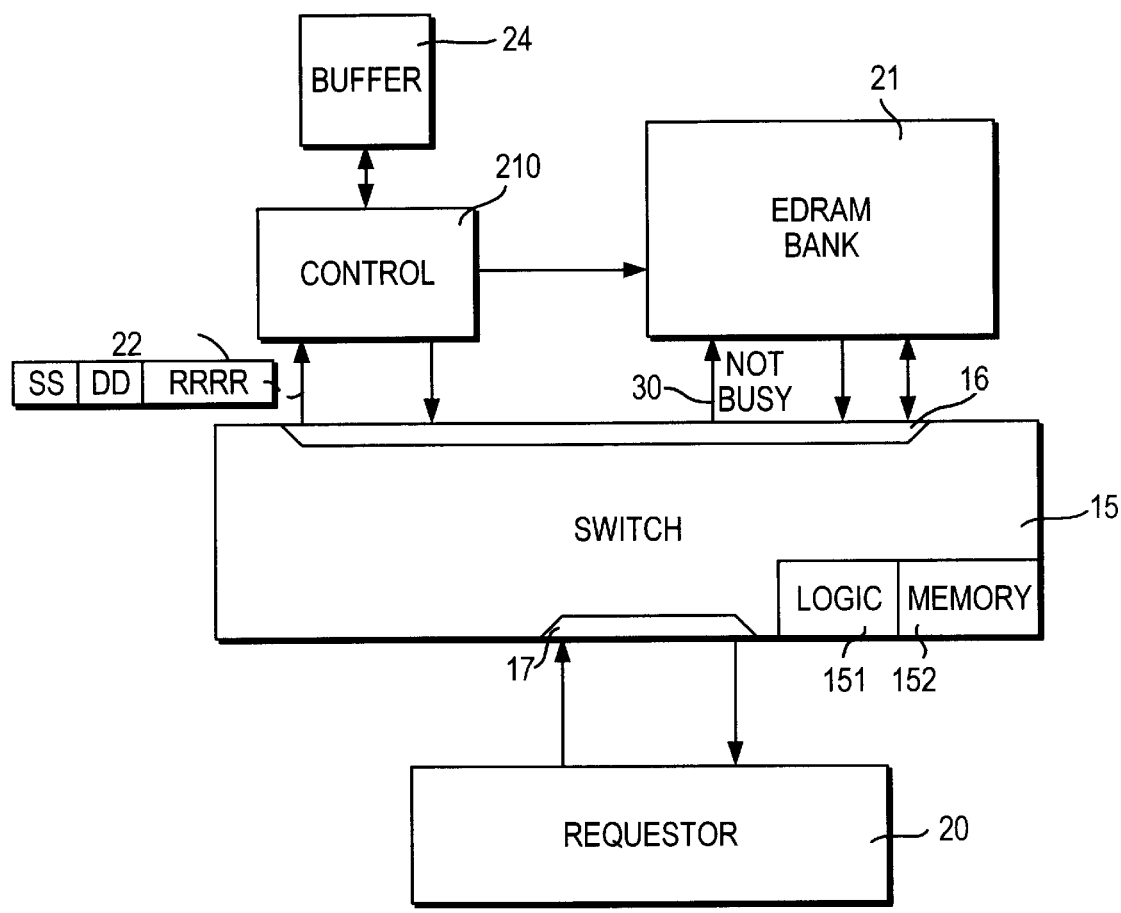

In FIG. 3, switch 15 is holding request 22 in memory 152 while logic 151 ascertains the status of the request busy indicator 30 of memory bank 21 (status not shown in this drawing). In FIG. 4, logic 151 ascertains that request busy indicator 30 is not asserted (memory bank 21 is not busy), either because indicator 30 was not asserted when request 22 arrived, or because indicator 30 was asserted when request 22 arrived, but switch 15 has held request 22 until indicator 30 has been deasserted.

Figure 5:
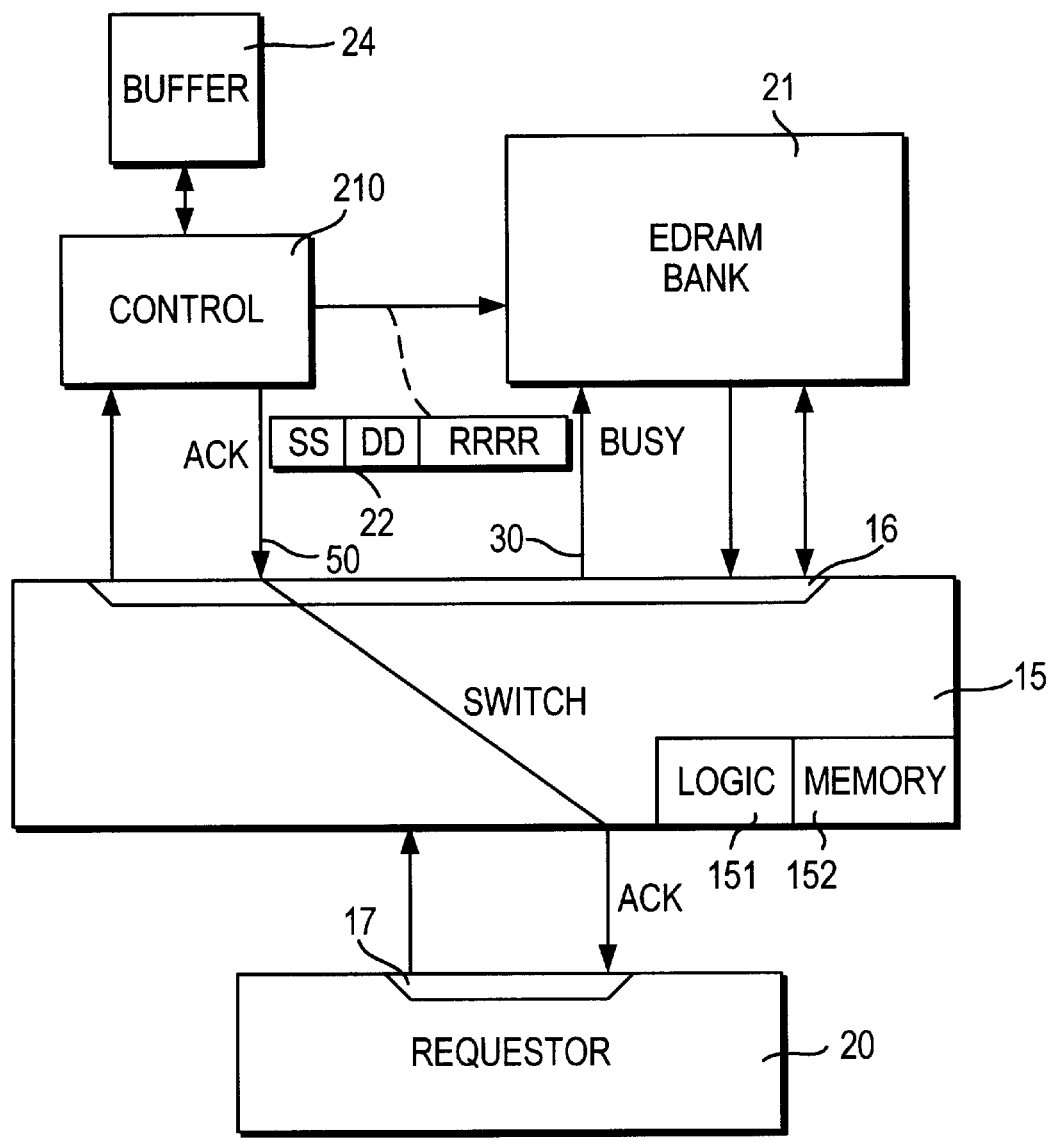

In FIG. 5, local controller 210 of memory bank 21 has accepted request 22, asserting request busy indicator 30 as it works to fulfill request 22, and issuing an acknowledgment signal (ACK) 50 which switch 15 returns to resource 20.

Switch 15 stores in memory 152 the fact that memory bank 21 is working on a request for resource 20 (memory 152 may also be storing information regarding other requests being processed by other memory banks for other system resources). During this time, if system resource 20 is able to perform other operations, it may issue additional memory requests (not shown); otherwise system resource 20 must wait idly until memory bank 21 fulfills request 22. In the latter case, data ready indicator 51 of resource 20 will be asserted, meaning that resource 20 is ready to receive data. In the former case, data ready indicator 51 may be deasserted during other operations as resource 20 is occupied with those other operations and temporarily unable to receive the data requested in request 22.

Figure 6:
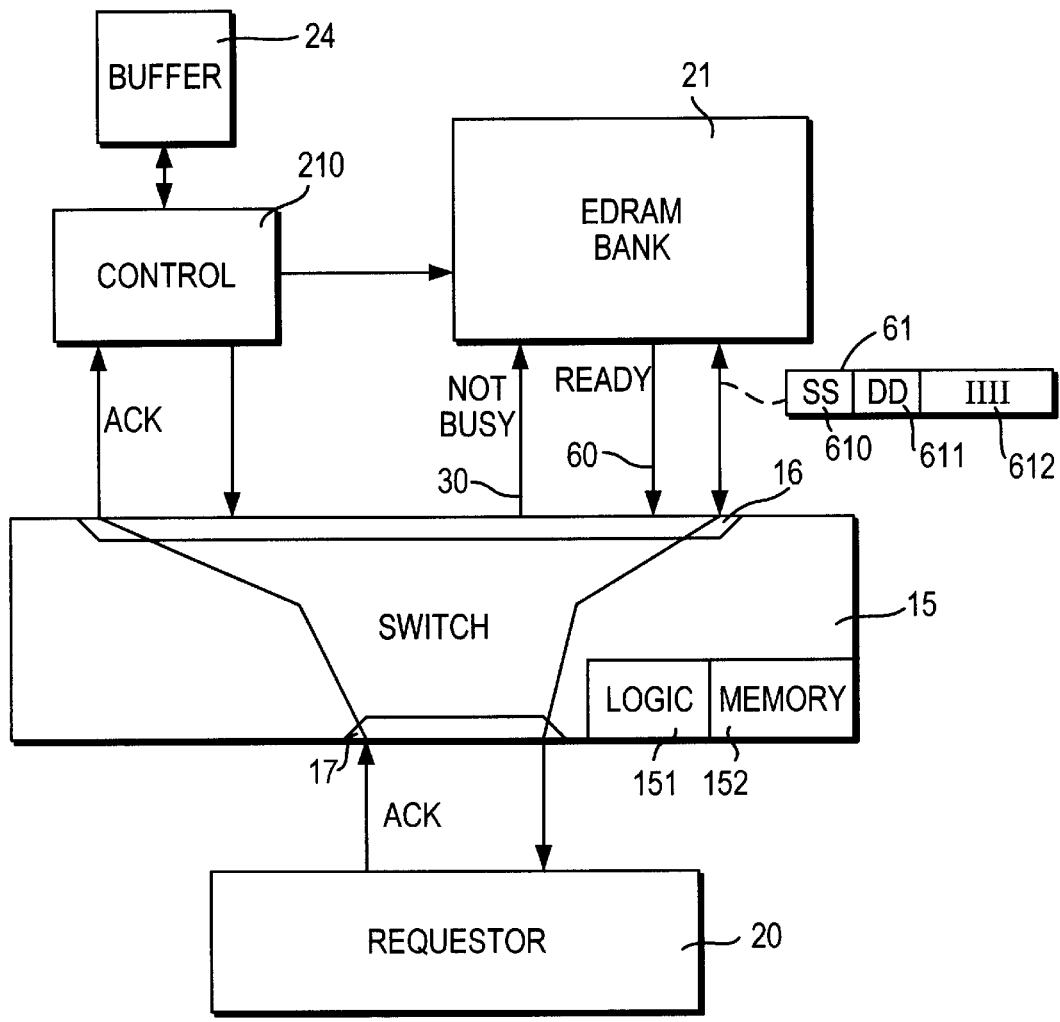

In FIG. 6, memory bank 21 has retrieved the data requested by resource 20 in request 22, and signals its readiness to return the requested data to resource 20 by asserting its data ready indicator 60 and deasserting its data busy indicator 30. The message 61 including the retrieved data may have a format similar to request 22, including three fields 610, 611, 612, respectively containing the source tag (indicated as "SS"), the destination tag ("DD") and the data themselves ("IIII"). In this transmission, memory bank 21 is the "source" and resource 20 is the "destination."

The source and destination tags 610, 611 can be applied by the local memory controller 210 based on the information contained in the original request 22. Alternatively, if each memory bank 21 is capable of responding to only one request at a time, then if logic 151 of switch 15 has stored in memory 152 the fact that memory bank 21 is working on a request for resource 20, then upon receipt of data from memory bank 21, logic 151 "knows" that they come from memory bank 21 and must be intended for resource 20, and can apply the source and destination tags 610, 611.

In fact, logic 151 can simply set switch 15 to establish a connection between memory bank 21 and resource 20 without applying any source or destination tag at all, assuming that resource 20 is not capable of having more than one outstanding data request, meaning that when switch 15 establishes a connection and resource 20 receives data, there will not be any ambiguity as to where the data come from. Even if resource 20 can have multiple requests outstanding, switch 15 can set up a connection and apply source tag 610 without a destination tag 611, because resource 20 does not need to know that it is the destination once the connection has been set up.

Similarly, it may be that resource 20 cannot perform other functions while awaiting fulfillment of request 22, but each memory bank 21 can handle multiple requests 22. In such a case, local memory controller 210 can apply a destination tag 611 but can omit source tag 610, because switch 15 cannot know without destination tag 611 which of several requests being handled by memory bank 21 is being responded to, and therefore cannot determine the destination resource 20 on its own, but resource 20 can only have one outstanding request and therefore does not need to be told which memory bank has sent the requested data.

Other combinations are possible. For example, even if resource 20 can have multiple outstanding requests, local controller 210 can apply a destination tag 611 (because switch 15 cannot know which of several requests being handled by memory bank 21 is being responded to, and therefore cannot determine the destination resource 20 on its own) but can omit source tag 610, and then logic 151 of switch 15 can apply the source tag 610 based on its "knowledge," by virtue of which memory port 16 the response comes from, of the identity of memory bank 21.

Preferably, the requesting resource 20 returns an acknowledgment signal to memory bank 21 upon receiving the requested data. This allows memory bank 21 to mark the request as fulfilled and move on to other requests. If memory bank 21 does not receive an acknowledgment from resource 20, it may queue the requested data in a buffer (not shown) for later retransmission while it moves on to other requests, or it may wait and retransmit the data at set intervals. While it is waiting to retransmit the data, local memory controller 210 would keep its data busy indicator 30 to prevent being disturbed by new requests. Similarly, controller 210 could inhibit the issuance of a column address strobe (CAS) signal, thereby preventing the reading of any other data from memory bank 21, until receipt of the retrieved data is acknowledged by resource 20.

Although the system 10 as shown in FIG. 1 includes three system resources and four memory banks, any number of resources and memory banks can be included.

In addition, although FIGS. 2–6 have been described in connection with a single transaction between system resource 20 and memory bank 21, multiple such transactions can occur simultaneously, among unique pairs of system resources memory banks. Accordingly, a system according to the invention allows faster communications between a system resources and memory banks in a computer or processor system than is possible in a bus architecture.

One skilled in the art will appreciate that the present invention can be practiced by other than the described embodiments, which are presented for purposes of illustration and not of limitation, and the present invention is limited only by the claims which follow.

What is claimed is:

1. A memory control system comprising:

a plurality of banks of memory;

a plurality of system resources that submit memory requests to said memory; and a switch interconnecting said plurality of banks of memory and said plurality of system resources and establishing communications between (a) a respective one of said resources, and (b) a respective one of said banks of memory of which said respective one of said resources makes a request, when said respective one of said resources and said respective one of said banks of memory are both available, wherein:

said switch comprises:

a plurality of memory ports at least corresponding to said plurality of banks of memory, each of said banks of memory being connected to one of said memory ports, and a plurality of requestor ports at least corresponding to said plurality of system resources, each of said at least one system resource being connected to one of said at least one requestor ports;

each one of at least some of said banks of memory signals to said switch (a) when said one of at least some of said banks of memory is busy and unavailable to accept requests, (b) when said one of at least some of said banks of memory is available to accept requests, and (c) when said one of at least some of said banks of memory has data to return in response to a request;

said switch forwards a request from a requesting one of said resources to a destination one of said banks of memory when said destination one of said banks of memory signals its availability to receive requests;

each one of at least some of said system resources signals to said switch (a) when said one of at least some of said system resources is busy and unavailable to accept data, and (b) when said one of at least some of said system resources is available to accept data; and said switch establishes a connection between a requesting one of said resources and a destination one of said embedded banks of memory when said destination one of said embedded banks of memory signals that it has data to return and said requesting one of said resources signals that it is available to receive data.

2. The memory control system of claim 1 comprising an integrated circuit device, wherein said switch is on said integrated circuit device and said plurality of banks of memory are embedded in said integrated circuit device.

3. The memory control system of claim 2 wherein at least one of said plurality of system resources is on said integrated circuit device.

4. The memory control system of claim 2 wherein:

a request from one of said at least one system resource to one of said embedded banks of memory includes a source tag identifying said at least one system resource, and a destination tag identifying said one of said embedded banks of memory.

5. The memory control system of claim 4 wherein said source tag is appended to said request by said at least one system resource.

6. The memory control system of claim 5 wherein said destination tag is appended to said request by said at least one system resource.

7. The memory control system of claim 4 wherein said destination tag is appended to said request by said at least one system resource.

8. The memory control system of claim 7 wherein said source tag is appended to said request by said switch based on which of said requestor ports said system resource is attached to.

9. The memory control system of claim 4 wherein said source tag is appended to said request by said switch based on which of said requestor ports said system resource is attached to.

10. The memory control system of claim 4 wherein:

when said switch receives a request having a destination tag identifying a particular one of said embedded banks of memory, said switch queues said request with other requests for said particular one of said embedded banks of memory and directs said request in its turn to said particular one of said embedded banks of memory when said particular one of said embedded banks of memory signals its availability to accept requests.

11. The memory control system of claim 10 wherein:

when said switch receives a signal from one of said at least some embedded banks of memory indicating that said one of said at least some embedded banks of memory has data to return in response to a request, said switch identifies which one of said at least one system resource issued said request, queues said response with other responses for said one of said at least one system resource and establishes a connection in turn between said particular one of said at least some embedded banks of memory and said one of said at least one system resource when said one of said at least one system resource signals its availability to receive data.

12. The memory control system of claim 11 wherein:

when said switch directs said request to said particular one of said embedded banks of memory, said switch maintains a record of said request and said source tag of said request; and when said switch receives a signal from one of said at least some embedded banks of memory indicating that said one of said at least some embedded banks of memory has data to return in response to a request, said switch identifies which one of said at least one system resource issued said request based on said record of said source tag.

13. The memory control system of claim 11 wherein:

when said switch directs said request to said particular one of said embedded banks of memory, said switch includes said source tag with said request; and when said switch receives a signal from one of said at least some embedded banks of memory indicating that said one of said at least some embedded banks of memory has data to return in response to a request, said signal includes said source tag and said switch identifies which one of said at least one system resource issued said request based on said source tag.

14. The memory control system of claim 4 wherein:

when said switch receives a signal from one of said at least some embedded banks of memory indicating that said one of said at least some embedded banks of memory has data to return in response to a request, said switch identifies which one of said at least one system resource issued said request, queues said response with other responses for said one of said at least one system resource and establishes a connection in turn between said particular one of said at least some embedded banks of memory and said one of said at least one system resource when said one of said at least one system resource signals its availability to receive data.

15. The memory control system of claim 14 wherein:

when said switch directs said request to said particular one of said embedded banks of memory, said switch maintains a record of said request and said source tag of said request; and when said switch receives a signal from one of said at least some embedded banks of memory indicating that said one of said at least some embedded banks of memory has data to return in response to a request, said switch identifies which one of said at least one system resource issued said request based on said record of said source tag.

16. The memory control system of claim 14, wherein:

when said switch directs said request to said particular one of said embedded banks of memory, said switch includes said source tag with said request; and when said switch receives a signal from one of said at least some embedded banks of memory indicating that said one of said at least some embedded banks of memory has data to return in response to a request, said signal includes said source tag and said switch identifies which one of said at least one system resource issued said request based on said source tag.

17. The memory control system of claim 2 wherein:

when said switch receives a request identifying a particular one of said embedded banks of memory, said switch queues said request with other requests for said particular one of said embedded banks of memory and directs said request in its turn to said particular one of said embedded banks of memory when said particular one of said embedded banks of memory signals its availability to accept requests.

18. The memory control system of claim 17 wherein:

when said switch receives a signal from one of said at least some embedded banks of memory indicating that said one of said at least some embedded banks of memory has data to return in response to a request, said switch identifies which one of said at least one system resource issued said request, queues said response with other responses for said one of said at least one system resource and establishes a connection in turn between said particular one of said at least some embedded banks of memory and said one of said at least one system resource when said one of said at least one system resource signals its availability to receive data.

19. The memory control system of claim 18 wherein:

when said switch directs said request to said particular one of said embedded banks of memory, said switch maintains a record of said request and which one of said at least one system resource issued said request; and when said switch receives a signal from one of said at least some embedded banks of memory indicating that said one of said at least some embedded banks of memory has data to return in response to a request, said switch identifies which one of said at least one system resource issued said request based on said record of which one of said at least one system resource issued said request.

20. The memory control system of claim 18 wherein:

when said switch directs said request to said particular one of said embedded banks of memory, said switch includes with said request an identification of which one of said at least one system resource issued said request; and when said switch receives a signal from one of said at least some embedded banks of memory indicating that said one of said at least some embedded banks of memory has data to return in response to a request, said signal includes said identification and said switch identifies which one of said at least one system resource issued said request based on said source tag.

21. The memory control system of claim 2 wherein:

when said switch receives a signal from one of said at least some embedded banks of memory indicating that said one of said at least some embedded banks of memory has data to return in response to a request, said switch identifies which one of said at least one system resource issued said request, queues said response with other responses for said one of said at least one system resource and establishes a connection in turn between said particular one of said at least some embedded banks of memory and said one of said at least one system resource when said one of said at least one system resource signals its availability to receive data.

22. The memory control system of claim 21 wherein:

when said switch directs said request to said particular one of said embedded banks of memory, said switch maintains a record of said request and which one of said at least one system resource issued said request; and when said switch receives a signal from one of said at least some embedded banks of memory indicating that said one of said at least some embedded banks of memory has data to return in response to a request, said switch identifies which one of said at least one system resource issued said request based on said record.

23. The memory control system of claim 1 wherein:

a request from one of said at least one system resource to one of said banks of memory includes a source tag identifying said at least one system resource, and a destination tag identifying said one of said banks of memory.

24. The memory control system of claim 23 wherein said source tag is appended to said request by said at least one system resource.

25. The memory control system of claim 24 wherein said destination tag is appended to said request by said at least one system resource.

26. The memory control system of claim 23 wherein said destination tag is appended to said request by said at least one system resource.

27. The memory control system of claim 26 wherein said source tag is appended to said request by said switch based on which of said requestor ports said system resource is attached to.

28. The memory control system of claim 23 wherein said source tag is appended to said request by said switch based on which of said requestor ports said system resource is attached to.

29. The memory control system of claim 23 wherein:
when said switch receives a request having a destination tag identifying a particular one of said banks of memory, said switch queues said request with other requests for said particular one of said banks of memory and directs said request in its turn to said particular one of said banks of memory when said particular one of said banks of memory signals its availability to accept requests.

30. The memory control system of claim 29 wherein:
when said switch receives a signal from one of said at least some banks of memory indicating that said one of said at least some banks of memory has data to return in response to a request, said switch identifies which one of said at least one system resource issued said request, queues said response with other responses for said one of said at least one system resource and establishes a connection in turn between said particular one of said at least some banks of memory and said one of said at least one system resource when said one of said at least one system resource signals its availability to receive data.

31. The memory control system of claim 30 wherein:
when said switch directs said request to said particular one of said banks of memory, said switch maintains a record of said request and said source tag of said request; and
when said switch receives a signal from one of said at least some banks of memory indicating that said one of said at least some banks of memory has data to return in response to a request, said switch identifies which one of said at least one system resource issued said request based on said record of said source tag.

32. The memory control system of claim 30 wherein:
when said switch directs said request to said particular one of said banks of memory, said switch includes said source tag with said request; and
when said switch receives a signal from one of said at least some banks of memory indicating that said one of said at least some banks of memory has data to return in response to a request, said signal includes said source tag and said switch identifies which one of said at least one system resource issued said request based on said source tag.

33. The memory control system of claim 23 wherein:
when said switch receives a signal from one of said at least some banks of memory indicating that said one of said at least some banks of memory has data to return in response to a request, said switch identifies which one of said at least one system resource issued said request, queues said response with other responses for said one of said at least one system resource and establishes a connection in turn between said particular one of said at least some banks of memory and said one of said at least one system resource when said one of said at least one system resource signals its availability to receive data.

34. The memory control system of claim 33 wherein:
when said switch directs said request to said particular one of said banks of memory, said switch maintains a record of said request and said source tag of said request; and
when said switch receives a signal from one of said at least some banks of memory indicating that said one of said at least some banks of memory has data to return in response to a request, said switch identifies which one of said at least one system resource issued said request based on said record of said source tag.

35. The memory control system of claim 33 wherein:
when said switch directs said request to said particular one of said banks of memory, said switch includes said source tag with said request; and
when said switch receives a signal from one of said at least some banks of memory indicating that said one of said at least some banks of memory has data to return in response to a request, said signal includes said source tag and said switch identifies which one of said at least one system resource issued said request based on said source tag.

36. The memory control system of claim 1 wherein:
when said switch receives a request identifying a particular one of said banks of memory, said switch queues said request with other requests for said particular one of said banks of memory and directs said request in its turn to said particular one of said banks of memory when said particular one of said banks of memory signals its availability to accept requests.

37. The memory control system of claim 36 wherein:
when said switch receives a signal from one of said at least some banks of memory indicating that said one of said at least some banks of memory has data to return in response to a request, said switch identifies which one of said at least one system resource issued said request, queues said response with other responses for said one of said at least one system resource and establishes a connection in turn between said particular one of said at least some banks of memory and said one of said at least one system resource when said one of said at least one system resource signals its availability to receive data.

38. The memory control system of claim 37 wherein:
when said switch directs said request to said particular one of said banks of memory, said switch maintains a record of said request and which one of said at least one system resource issued said request; and
when said switch receives a signal from one of said at least some banks of memory indicating that said one of said at least some banks of memory has data to return in response to a request, said switch identifies which one of said at least one system resource issued said request based on said record of which one of said at least one system resource issued said request.

39. The memory control system of claim 37 wherein:
when said switch directs said request to said particular one of said banks of memory, said switch includes said source tag with said request; and
when said switch receives a signal from one of said at least some banks of memory indicating that said one of said at least some banks of memory has data to return in response to a request, said signal includes said source tag and said switch identifies which one of said at least one system resource issued said request based on said source tag.

40. The memory control system of claim 1 wherein:

when said switch receives a signal from one of said at least some banks of memory indicating that said one of said at least some banks of memory has data to return in response to a request, said switch identifies which one of said at least one system resource issued said request, queues said response with other responses for said one of said at least one system resource and establishes a connection in turn between said particular one of said at least some banks of memory and said one of said at least one system resource when said one of said at least one system resource signals its availability to receive data.

41. The memory control system of claim 40 wherein:

when said switch directs said request to said particular one of said banks of memory, said switch maintains a record of said request and which one of said at least one system resource issued said request; and when said switch receives a signal from one of said at least some banks of memory indicating that said one of said at least some banks of memory has data to return in response to a request, said switch identifies which one of said at least one system resource issued said request based on said record.

42. A memory control system comprising:

a plurality of banks of memory means;

a plurality of system resource means that submit memory requests to said memory means; and switch means interconnecting said plurality of banks of memory means and said plurality of system resource means and establishing communications between (a) a respective one of said resource means, and (b) a respective one of said banks of memory means of which said respective one of said resource means makes a request, when said respective one of said resource means and said respective one of said banks of memory means are both available; wherein:

said switch means comprises:

a plurality of memory port means at least corresponding to said plurality of embedded banks of memory means, each of said embedded banks of memory means being connected to one of said memory port means, and a plurality of requestor port means at least corresponding to said plurality of system resource means, each of said at least one system resource means being connected to one of said at least one requestor port means;

each one of at least some of said embedded banks of memory means signals to said switch means (a) when said one of at least some of said embedded banks of memory means is busy and unavailable to accept requests, (b) when said one of at least some of said embedded banks of memory means is available to accept requests, and (c) when said one of at least some of said embedded banks of memory means has data to return in response to a request; and said switch means forwards a request from a requesting one of said resources to a destination one of said embedded banks of memory means when said destination one of said embedded banks of memory means signals its availability to receive requests;

each one of at least some of said system resource means signals to said switch means (a) when said one of at least some of said system resource means is busy and unavailable to accept data, and (b) when said one of at least some of said system resource means is available to accept data; and said switch means establishes a connection between a requesting one of said resource means and a destination one of said embedded banks of memory means when said destination one of said embedded banks of memory means signals that it has data to return and said requesting one of said resource means signals that it is available to receive data.

43. The memory control system of claim 42 comprising an integrated circuit means, wherein said switch means is on said integrated circuit means and said plurality of banks of memory means are embedded in said integrated circuit means.

44. The memory control system of claim 43 wherein at least one of said plurality of system resource means is on said integrated circuit means.

45. The memory control system of claim 43 wherein:

a request from one of said at least one system resource means to one of said embedded banks of memory means includes a source tag identifying said at least one system resource means, and a destination tag identifying said one of said embedded banks of memory means.

46. The memory control system of claim 45 wherein said source tag is appended to said request by said at least one system resource means.

47. The memory control system of claim 46 wherein said destination tag is appended to said request by said at least one system resource means.

48. The memory control system of claim 45 wherein said destination tag is appended to said request by said at least one system resource means.

49. The memory control system of claim 48 wherein said source tag is appended to said request by said switch means based on which of said requestor port means said system resource means is attached to.

50. The memory control system of claim 45 wherein said source tag is appended to said request by said switch means based on which of said requestor port means said system resource means is attached to.

51. The memory control system of claim 45 wherein:

when said switch means receives a request having a destination tag identifying a particular one of said embedded banks of memory means, said switch means queues said request with other requests for said particular one of said embedded banks of memory means and directs said request in its turn to said particular one of said embedded banks of memory means when said particular one of said embedded banks of memory means signals its availability to accept requests.

52. The memory control system of claim 51 wherein:

when said switch means receives a signal from one of said at least some embedded banks of memory means indicating that said one of said at least some embedded banks of memory means has data to return in response to a request, said switch means identifies which one of said at least one system resource means issued said request, queues said response with other responses for said one of said at least one system resource means and establishes a connection in turn between said particular one of said at least some embedded banks of memory means and said one of said at least one system resource means when said one of said at least one system resource means signals its availability to receive data.

53. The memory control system of claim 52 wherein:
when said switch means directs said request to said particular one of said embedded banks of memory means, said switch means maintains a record of said request and said source tag of said request; and
when said switch means receives a signal from one of said at least some embedded banks of memory means indicating that said one of said at least some embedded banks of memory means has data to return in response to a request, said switch means identifies which one of said at least one system resource means issued said request based on said record of said source tag.

54. The memory control system of claim 52 wherein:
when said switch means directs said request to said particular one of said embedded banks of memory means, said switch means includes said source tag with said request; and
when said switch receives a signal from one of said at least some embedded banks of memory means indicating that said one of said at least some embedded banks of memory means has data to return in response to a request, said signal includes said source tag and said switch identifies which one of said at least one system resource means issued said request based on said source tag.

55. The memory control system of claim 45 wherein:
when said switch means receives a signal from one of said at least some embedded banks of memory means indicating that said one of said at least some embedded banks of memory means has data to return in response to a request, said switch means identifies which one of said at least one system resource means issued said request, queues said response with other responses for said one of said at least one system resource means and establishes a connection in turn between said particular one of said at least some embedded banks of memory means and said one of said at least one system resource means when said one of said at least one system resource means signals its availability to receive data.

56. The memory control system of claim 55 wherein:
when said switch means directs said request to said particular one of said embedded banks of memory means, said switch means maintains a record of said request and said source tag of said request; and
when said switch means receives a signal from one of said at least some embedded banks of memory means indicating that said one of said at least some embedded banks of memory means has data to return in response to a request, said switch means identifies which one of said at least one system resource means issued said request based on said record of said source tag.

57. The memory control system of claim 55 wherein:
when said switch means directs said request to said particular one of said embedded banks of memory means, said switch means includes said source tag with said request; and
when said switch means receives a signal from one of said at least some embedded banks of memory means indicating that said one of said at least some embedded banks of memory means has data to return in response to a request, said signal includes said source tag and said switch identifies which one of said at least one system resource means issued said request based on said source tag.

58. The memory control system of claim 43 wherein:
when said switch means receives a request identifying a particular one of said embedded banks of memory means, said switch means queues said request with other requests for said particular one of said embedded banks of memory means and directs said request in its turn to said particular one of said embedded banks of memory means when said particular one of said embedded banks of memory means signals its availability to accept requests.

59. The memory control system of claim 58 wherein:
when said switch means receives a signal from one of said at least some embedded banks of memory means indicating that said one of said at least some embedded banks of memory means has data to return in response to a request, said switch means identifies which one of said at least one system resource means issued said request, queues said response with other responses for said one of said at least one system resource means and establishes a connection in turn between said particular one of said at least some embedded banks of memory means and said one of said at least one system resource means when said one of said at least one system resource means signals its availability to receive data.

60. The memory control system of claim 59 wherein:
when said switch means directs said request to said particular one of said embedded banks of memory means, said switch means maintains a record of said request and which one of said at least one system resource means issued said request; and
when said switch means receives a signal from one of said at least some embedded banks of memory means indicating that said one of said at least some embedded banks of memory means has data to return in response to a request, said switch means identifies which one of said at least one system resource means issued said request based on said record of which one of said at least one system resource means issued said request.

61. The memory control system of claim 59 wherein:
when said switch means directs said request to said particular one of said embedded banks of memory means, said switch means includes with said request an identification of which one of said at least one system resource issued said request; and
when said switch means receives a signal from one of said at least some embedded banks of memory means indicating that said one of said at least some embedded banks of memory means has data to return in response to a request, said signal includes said source tag and said switch means identifies which one of said at least one system resource means issued said request based on said source tag.

62. The memory control system of claim 43 wherein:
when said switch means receives a signal from one of said at least some embedded banks of memory means indicating that said one of said at least some embedded banks of memory means has data to return in response to a request, said switch means identifies which one of said at least one system resource means issued said request, queues said response with other responses for said one of said at least one system resource means and establishes a connection in turn between said particular one of said at least some embedded banks of memory means and said one of said at least one system resource means when said one of said at least one system resource means signals its availability to receive data.

63. The memory control system of claim 62 wherein:
when said switch means directs said request to said particular one of said embedded banks of memory means, said switch means maintains a record of said request and which one of said at least one system resource means issued said request; and when said switch means receives a signal from one of said at least some embedded banks of memory means indicating that said one of said at least some embedded banks of memory means has data to return in response to a request, said switch means identifies which one of said at least one system resource means issued said request based on said record.

64. The memory control system of claim 42 wherein:

a request from one of said at least one system resource means to one of said banks of memory means includes a source tag identifying said at least one system resource means, and a destination tag identifying said one of said banks of memory means.

65. The memory control system of claim 64 wherein said source tag is appended to said request by said at least one system resource means.

66. The memory control system of claim 65 wherein said destination tag is appended to said request by said at least one system resource means.

67. The memory control system of claim 64 wherein said destination tag is appended to said request by said at least one system resource means.

68. The memory control system of claim 67 wherein said source tag is appended to said request by said switch means based on which of said requestor port means said system resource means is attached to.

69. The memory control system of claim 64 wherein said source tag is appended to said request by said switch means based on which of said requestor port means said system resource means is attached to.

70. The memory control system of claim 64 wherein:

when said switch means receives a request having a destination tag identifying a particular one of said banks of memory means, said switch means queues said request with other requests for said particular one of said banks of memory means and directs said request in its turn to said particular one of said banks of memory means when said particular one of said banks of memory means signals its availability to accept requests.

71. The memory control system of claim 70 wherein:

when said switch means receives a signal from one of said at least some banks of memory means indicating that said one of said at least some banks of memory means has data to return in response to a request, said switch means identifies which one of said at least one system resource means issued said request, queues said response with other responses for said one of said at least one system resource means and establishes a connection in turn between said particular one of said at least some banks of memory means and said one of said at least one system resource means when said one of said at least one system resource means signals its availability to receive data.

72. The memory control system of claim 71 wherein:

when said switch means directs said request to said particular one of said banks of memory means, said switch means maintains a record of said request and said source tag of said request; and when said switch means receives a signal from one of said at least some banks of memory means indicating that said one of said at least some banks of memory means has data to return in response to a request, said switch means identifies which one of said at least one system resource means issued said request based on said record of said source tag.

73. The memory control system of claim 71 wherein:

when said switch means directs said request to said particular one of said banks of memory means, said switch means includes said source tag with said request; and when said switch means receives a signal from one of said at least some banks of memory means indicating that said one of said at least some banks of memory means has data to return in response to a request, said signal includes said source tag and said switch means identifies which one of said at least one system resource means issued said request based on said source tag.

74. The memory control system of claim 64 wherein:

when said switch means receives a signal from one of said at least some banks of memory means indicating that said one of said at least some banks of memory means has data to return in response to a request, said switch means identifies which one of said at least one system resource means issued said request, queues said response with other responses for said one of said at least one system resource means and establishes a connection in turn between said particular one of said at least some banks of memory means and said one of said at least one system resource means when said one of said at least one system resource means signals its availability to receive data.

75. The memory control system of claim 74 wherein:

when said switch means directs said request to said particular one of said banks of memory means, said switch means maintains a record of said request and said source tag of said request; and when said switch means receives a signal from one of said at least some banks of memory means indicating that said one of said at least some banks of memory means has data to return in response to a request, said switch means identifies which one of said at least one system resource means issued said request based on said record of said source tag.

76. The memory control system of claim 74 wherein:

when said switch means directs said request to said particular one of said banks of memory means, said switch means includes said source tag with said request; and when said switch means receives a signal from one of said at least some banks of memory means indicating that said one of said at least some banks of memory means has data to return in response to a request, said signal includes said source tag and said switch means identifies which one of said at least one system resource means issued said request based on said source tag.

77. The memory control system of claim 42 wherein:

when said switch means receives a request identifying a particular one of said banks of memory means, said switch means queues said request with other requests for said particular one of said banks of memory means and directs said request in its turn to said particular one of said banks of memory means when said particular one of said banks of memory means signals its availability to accept requests.

78. The memory control system of claim 77 wherein:

when said switch means receives a signal from one of said at least some banks of memory means indicating that said one of said at least some banks of memory means has data to return in response to a request, said switch means identifies which one of said at least one system resource means issued said request, queues said response with other responses for said one of said at least one system resource means and establishes a connection in turn between said particular one of said at least some banks of memory means and said one of said at least one system resource means when said one of said at least one requestor signals its availability to receive data.

79. The memory control system of claim 78 wherein:

when said switch means directs said request to said particular one of said banks of memory means, said switch means maintains a record of said request and which one of said at least one system resource means issued said request; and when said switch means receives a signal from one of said at least some banks of memory means indicating that said one of said at least some banks of memory means has data to return in response to a request, said switch means identifies which one of said at least one system resource means issued said request based on said record of which one of said at least one system resource means issued said request.

80. The memory control system of claim 78 wherein:

when said switch means directs said request to said particular one of said banks of memory means, said switch means includes said source tag with said request; and when said switch means receives a signal from one of said at least some banks of memory means indicating that said one of said at least some banks of memory means has data to return in response to a request, said signal includes said source tag and said switch means identifies which one of said at least one system resource means issued said request based on said source tag.

81. The memory control system of claim 42 wherein:

when said switch means receives a signal from one of said at least some banks of memory means indicating that said one of said at least some banks of memory means has data to return in response to a request, said switch means identifies which one of said at least one system resource means issued said request, queues said response with other responses for said one of said at least one system resource means and establishes a connection in turn between said particular one of said at least some banks of memory means and said one of said at least one system resource means when said one of said at least one system resource means signals its availability to receive data.

82. The memory control system of claim 81 wherein:

when said switch means directs said request to said particular one of said banks of memory means, said switch means maintains a record of said request and which one of said at least one system resource means issued said request; and when said switch means receives a signal from one of said at least some banks of memory means indicating that said one of said at least some banks of memory means has data to return in response to a request, said switch means identifies which one of said at least one system resource means issued said request based on said record.

83. A memory control method for use in a system having:
a plurality of banks of memory, and
a plurality of system resources that submit memory requests to said memory; said method comprising:

establishing communications between (a) a respective one of said resources, and (b) a respective one of said banks of memory of which said respective one of said resources makes a request, when said respective one of said resources and said respective one of said banks of memory are both available: wherein said establishing comprises:

each one of at least some of said banks of memory signalling (a) when said one of at least some of said banks of memory is busy and unavailable to accept requests, (b) when said one of at least some of said banks of memory is available to accept requests, and (c) when said one of at least some of said banks of memory has data to return in response to a request;

forwarding a request from a requesting one of said resources to a destination one of said banks of memory when said destination one of said banks of memory signals its availability to receive requests;

each one of at least some of said system resources signalling (a) when said one of at least some of said system resources is busy and unavailable to accept data, and (b) when said one of at least some of said system resources is available to accept data; and establishing a connection between a requesting one of said resources and a destination one of said banks of memory when said destination one of said banks of memory signals that it has data to return and said requesting one of said resources signals that it is available to receive data.

84. The memory control method of claim 83 further comprising applying, to a request from one of said at least one system resource to one of said banks of memory, a source tag identifying said at least one system resource, and a destination tag identifying said one of said banks of memory.

85. The memory control method of claim 84 wherein said source tag is appended to said request by said at least one system resource.

86. The memory control method of claim 85 wherein said destination tag is appended to said request by said at least one system resource.

87. The memory control method of claim 84 wherein said destination tag is appended to said request by said at least one system resource.

88. The memory control method of claim 87 wherein said source tag is appended to said request by a system component having knowledge of which of said system resources issued said request.

89. The memory control method of claim 84 wherein said source tag is appended to said request by a system component having knowledge of which of said system resources issued said request.

90. The memory control method of claim 84 further comprising, upon receipt of a request having a destination tag identifying a particular one of said banks of memory:

queuing said request with other requests for said particular one of said banks of memory; and directing said request in its turn to said particular one of said banks of memory when said particular one of said banks of memory signals its availability to accept requests.

91. The memory control method of claim 90 further comprising, upon receipt of a signal from one of said at least some banks of memory indicating that said one of said at least some banks of memory has data to return in response to a request:

identifying which one of said at least one system resource issued said request;

queuing said response with other responses for said one of said at least one system resource; and establishing a connection in turn between said particular one of said at least some banks of memory and said one of said at least one system resource when said one of said at least one system resource signals its availability to receive data.

92. The memory control method of claim 91 further comprising:

upon direction of said request to said particular one of said banks of memory, maintaining a record of said request and said source tag of said request; and upon receipt of a signal from one of said at least some banks of memory indicating that said one of said at least some banks of memory has data to return in response to a request, identifying which one of said at least one system resource means issued said request based on said record of said source tag.

93. The memory control method of claim 91 further comprising:

upon direction of said request to said particular one of said banks of memory, including said source tag with said request; and upon receipt of a signal from one of said at least some banks of memory indicating that said one of said at least some banks of memory has data to return in response to a request and including said source tag, identifying which one of said at least one system resource issued said request based on said source tag.

94. The memory control method of claim 84 further comprising, upon receipt of a signal from one of said at least some banks of memory indicating that said one of said at least some banks of memory has data to return in response to a request:

identifying which one of said at least one system resource means issued said request;

queuing said response with other responses for said one of said at least one system resource means; and establishing a connection in turn between said particular one of said at least some banks of memory and said one of said at least one system resource when said one of said at least one system resource signals its availability to receive data.

95. The memory control method of claim 94 wherein:

upon direction of said request to said particular one of said banks of memory, maintaining a record of said request and said source tag of said request; and upon receipt of a signal from one of said at least some banks of memory indicating that said one of said at least some banks of memory has data to return in response to a request, identifying which one of said at least one system resource issued said request based on said record of said source tag.

96. The memory control method of claim 94 wherein:

upon direction of said request to said particular one of said banks of memory, including said source tag with said request; and upon receipt of a signal from one of said at least some banks of memory indicating that said one of said at least some banks of memory has data to return in response to a request and including said source tag, identifying which one of said at least one system resource issued said request based on said source tag.

97. The memory control method of claim 83 further comprising, upon receipt of a request identifying a particular one of said banks of memory:

queuing said request with other requests for said particular one of said banks of memory means; and directing said request in its turn to said particular one of said banks of memory when said particular one of said banks of memory signals its availability to accept requests.

98. The memory control method of claim 97 further comprising, upon receipt of a signal from one of said at least some banks of memory indicating that said one of said at least some banks of memory has data to return in response to a request:

identifying which one of said at least one system resource issued said request;

queuing said response with other responses for said one of said at least one system resource; and establishing a connection in turn between said particular one of said at least some banks of memory and said one of said at least one system resource when said one of said at least one system resource signals its availability to receive data.

99. The memory control method of claim 98 further comprising:

upon direction of said request to said particular one of said banks of memory, maintaining a record of said request and which one of said at least one system resource issued said request; and upon receipt of a signal from one of said at least some banks of memory indicating that said one of said at least some banks of memory has data to return in response to a request, identifying which one of said at least one system resource issued said request based on said record of which one of said at least one system resource issued said request.

100. The memory control method of claim 98 wherein:

upon direction of said request to said particular one of said banks of memory, including with said request an identification of which one of said at least one system resource issued said request; and upon receipt of a signal from one of said at least some banks of memory indicating that said one of said at least some banks of memory has data to return in response to a request and including said identification, identifying which one of said at least one system resource issued said request based on said identification.

101. The memory control method of claim 83 further comprising, upon receipt of a signal from one of said at least some banks of memory indicating that said one of said at least some banks of memory has data to return in response to a request:

identifying which one of said at least one system resource issued said request;

queuing said response with other responses for said one of said at least one system resource; and establishing a connection in turn between said particular one of said at least some banks of memory and said one of said at least one system resource when said one of said at least one system resource signals its availability to receive data.

102. The memory control method of claim 101 further comprising:

upon direction of said request to said particular one of said banks of memory, maintaining a record of said request and which one of said at least one system resource issued said request; and upon receipt of a signal from one of said at least some banks of memory indicating that said one of said at least some banks of memory has data to return in response to a request, identifying which one of said at least one system resource issued said request based on said record.

* * * * *

UNITED STATES PATENT AND TRADEMARK OFFICE
CERTIFICATE OF CORRECTION

PATENT NO. : 6,789,155 B2
DATED : September 7, 2004
INVENTOR(S) : Joseph Jeddeloh It is certified that error appears in the above-identified patent and that said Letters Patent is hereby corrected as shown below:

Column 2,
Lines 17 and 18, "requester" should be -- requestor --.

Column 3,
Lines 12, 31 and 56, "requester" should be -- requestor --.

Column 4,
Lines 2 and 49, "requester" should be -- requestor --;
Line 67, "19 100" should be -- 19, 100 --.

Column 5,
Lines 27, 31, 40 and 50, "requester" should be -- requestor --.

Signed and Sealed this

Fifth Day of April, 2005

JON W. DUDAS
*Director of the United States Patent and Trademark Office*